E. Shopbell,
LIFTING JACK,

No. 73657

PATENTED
JAN 21 1868

Inventor
Elias Shopbell

Witnesses
W. H. Burridge
J. Kohnes

United States Patent Office.

ELIAS SHOPBELL, OF ASHLAND, OHIO.

Letters Patent No. 73,657, dated January 21, 1868.

IMPROVEMENT IN LIFTING-JACK.

The Schedule referred to in these Letters Patent and making part of the same.

TO ALL WHOM IT MAY CONCERN:

Be it known that I, ELIAS SHOPBELL, of Ashland, in the county of Ashland, and State of Ohio, have invented certain new and useful Improvements in Lifting-Jacks; and I do hereby declare that the following is a full and complete description of the same, reference being had to the accompanying drawings, making a part of this specification, in which—

Figure 1:
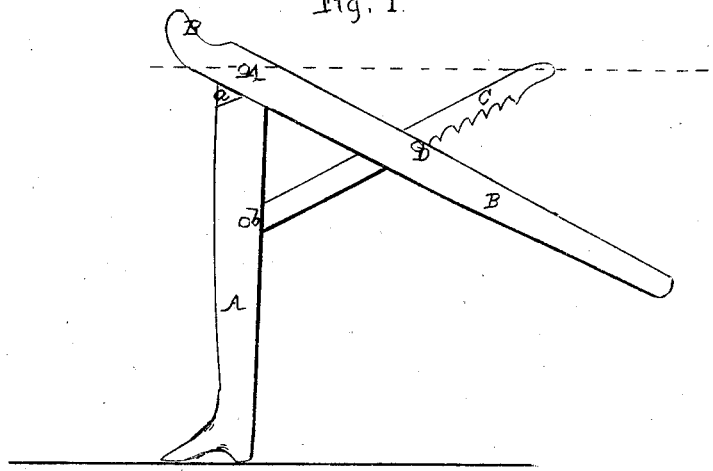
Figure 2:
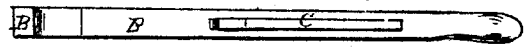

Figure 1 is a side view.
Figure 2 is a top view.
Like letters of reference refer to like parts in the views.

A, fig. 1, is the standard, to which is pivoted, at A', the lever B, the top of the standard forming a tenon, $a$, which extends into a mortise cut in the end of the lever, and is there pivoted by a pin passing through them, and thus securing the lever to the standard. C is a rack, pivoted at $b$ to the standard, the other end passing through a slot in the lever, as shown. Extending across one end of this slot is the pin D, which acts as a catch for the rack.

When the jack is to be used, it is put in position indicated by the dotted line, fig. 1, with the end B' of the lever under the weight. Then, by pushing or pressing down the other end of the lever, the weight is raised, and can be held in place by means of the rack C catching on the pin D.

What I claim as my improvement, and desire to secure by Letters Patent, is—

The standard A, provided with a tenon, $a$, and pivoted at A' to the lever B, the rack C passing through a slot in the lever, and pivoted at $b$ to the standard, when arranged and combined as herein described for the purpose set forth.

ELIAS SHOPBELL.

Witnesses:
W. H. BURRIDGE.
J. HOLMES.